United States Patent
Koide et al.

(10) Patent No.: US 9,737,944 B2
(45) Date of Patent: Aug. 22, 2017

(54) THREAD-CUTTING TAP

(71) Applicants: Fuminari Koide, Toyokawa (JP);
Katsuto Kawada, Toyokawa (JP);
Takayuki Nakajima, Toyokawa (JP)

(72) Inventors: Fuminari Koide, Toyokawa (JP);
Katsuto Kawada, Toyokawa (JP);
Takayuki Nakajima, Toyokawa (JP)

(73) Assignee: OSG CORPORATION, Toyokawa-shi (JP)

( * ) Notice: Subject to any disclaimer, the term of this patent is extended or adjusted under 35 U.S.C. 154(b) by 0 days.

(21) Appl. No.: 14/785,742

(22) PCT Filed: May 24, 2013

(86) PCT No.: PCT/JP2013/064535
§ 371 (c)(1),
(2) Date: Oct. 20, 2015

(87) PCT Pub. No.: WO2014/188603
PCT Pub. Date: Nov. 27, 2014

(65) Prior Publication Data
US 2016/0089738 A1    Mar. 31, 2016

(51) Int. Cl.
*B23G 5/06* (2006.01)

(52) U.S. Cl.
CPC ............ *B23G 5/06* (2013.01); *B23G 2200/30* (2013.01); *B23G 2200/48* (2013.01); *Y10T 408/9048* (2015.01)

(58) Field of Classification Search
CPC .. B23G 5/06; B23G 2200/30; B23G 2200/48; Y10T 408/9048

(Continued)

(56) References Cited

U.S. PATENT DOCUMENTS 3,021,538 A    2/1962   Linley
5,487,626 A    1/1996   Von Holst et al.
(Continued)

FOREIGN PATENT DOCUMENTS

CN    101534982 A    9/2009
CN    101563180 A    10/2009
(Continued)

OTHER PUBLICATIONS

Jun. 18, 2013 International Search Report issued in International Patent Application No. PCT/JP2013/064535.
(Continued)

*Primary Examiner* — Eric A Gates
(74) *Attorney, Agent, or Firm* — Oliff PLC

(57) ABSTRACT

A thread-cutting tap includes: a thread portion having an external thread, and including a chamfered portion and a complete thread portion that is axially adjacent to the chamfered portion; a flute extending from an axially distal end of the tap toward an axially proximal end of the tap; a rake face defined by one of widthwise opposite end portions of the flute; and a cutting edge defined by one of widthwise opposite edges of the flute, so as to be adjacent to the rake face and extend along the flute. The cutting edge is provided with a protrusion portion at least in a radially outer end portion of the chamfered portion, such that the protrusion portion protrudes from the rake face forwardly in the rotation direction and extends along the cutting edge.

6 Claims, 7 Drawing Sheets

(58) Field of Classification Search
USPC ........................................................ 470/198
See application file for complete search history.

(56) References Cited

U.S. PATENT DOCUMENTS

| | | | | |
|---|---|---|---|---|
| 5,797,710 | A * | 8/1998 | Sawabe | B23G 7/02 408/215 |
| 6,213,692 | B1 * | 4/2001 | Guehring | B23B 51/02 408/144 |
| 7,665,934 | B2 * | 2/2010 | Henderer | B23G 5/06 408/219 |
| 8,087,856 | B2 * | 1/2012 | Reed | B23G 5/06 408/215 |
| 8,186,915 | B2 * | 5/2012 | Nakajima | B23G 5/06 408/222 |
| 8,210,779 | B2 * | 7/2012 | Henderer | B23G 5/06 408/219 |
| 2005/0042049 | A1 * | 2/2005 | Schwarz | B23G 5/06 408/222 |
| 2008/0095587 | A1 | 4/2008 | Henderer et al. | |
| 2009/0317203 | A1 | 12/2009 | Nakajima et al. | |
| 2011/0020087 | A1 | 1/2011 | Yamamoto et al. | |
| 2012/0301236 | A1 | 11/2012 | Ohhashi et al. | |

FOREIGN PATENT DOCUMENTS

| | | | |
|---|---|---|---|
| CN | 101977718 A | 2/2011 | |
| CN | 202278273 U | 6/2012 | |
| CN | 102712055 A | 10/2012 | |
| EP | 1864736 A2 * | 12/2007 | ............... B23C 5/10 |
| EP | 2073966 A2 | 7/2009 | |
| GB | 1090875 A * | 11/1967 | ............... B23G 5/06 |
| JP | S49130576 A | 12/1974 | |
| JP | H07164247 A | 6/1995 | |
| JP | H10-118844 A | 5/1998 | |
| JP | 2008272856 A | 11/2008 | |
| JP | 2010506747 A | 3/2010 | |
| NO | 2008/048853 A2 | 4/2008 | |
| TW | M419631 U | 1/2012 | |
| WO | 2008075402 A1 | 6/2008 | |

OTHER PUBLICATIONS

Sep. 5, 2016 Office Action issued in Chinese Application No. 20138007617.2.
Jun. 29, 2016 Office Action issued in Japanese Patent Application No. 2015-518036.
Jun. 24, 2016 Office Action issued in Taiwanese Patent Application No. 103110682.
Dec. 19, 2016 Search Report issued in European Patent Application No. 13885415.3.
Mar. 28, 2017 Office Action issued in Chinese Patent Application No. 201380076517.2.

* cited by examiner

| MAXIMUM TORQUE VALUE MZ (Nm) | MINIMUM THRUST VALUE (N) |
|---|---|
| 2.36 | −169.7 |
| INTERNAL THREAD ACCURACY | MAXIMUM THRUST VALUE (N) |
| UNACCEPTABLE (WP 2.8 ROTATIONS) | 8.77 |

| MAXIMUM TORQUE VALUE MZ (Nm) | MINIMUM THRUST VALUE (N) |
|---|---|
| 2.32 | −145.2 |
| INTERNAL THREAD ACCURACY | MAXIMUM THRUST VALUE (N) |
| UNACCEPTABLE (WP 3.0 ROTATIONS) | 7.99 |

FIG.8

| | WIDTH Hw (CONVERSION IN H) | WIDTH Hw (mm) | DURABILITY NUMBER (HOLES) | DURABILITY JUDGMENT | INTERNAL THREAD ACCURACY AT INITIAL STAGE |
|---|---|---|---|---|---|
| PRIOR ART A | NO (SHARP EDGE) | 0 | 0 | TEST SUSPENDED | UNACCEPTABLE (WP OUT) |
| PRIOR ART B | NO (ROUND CHAMFERED EDGE) | 0.02 | 0 | TEST SUSPENDED | UNACCEPTABLE (WP OUT) |
| COMPARATIVE PRODUCT C | H/110 | 0.008 | 1300 | LARGE CHIPPING, SUSPENDED | ACCEPTABLE (WP 1.5 ROTATIONS) |
| INVENTION PRODUCT D | H/80 | 0.011 | 2487 | BREAKAGE | ACCEPTABLE (WP 0.5 ROTATIONS) |
| INVENTION PRODUCT E | H/50 | 0.022 | 2830 | LARGE WEAR | ACCEPTABLE (WP 0.5 ROTATIONS) |
| INVENTION PRODUCT F | H/30 | 0.029 | 2854 | LARGE WEAR | ACCEPTABLE (WP 0.5 ROTATIONS) |
| INVENTION PRODUCT G | H/20 | 0.043 | 2349 | SUSPENDED DUE TO UNUSUAL NOISES | ACCEPTABLE (WP 0.5 ROTATIONS) |
| COMPARATIVE PRODUCT H | H/10 | 0.087 | 560 | BREAKAGE/UNSTABLE CUTTING CHIPS | ACCEPTABLE (WP 0.5 ROTATIONS) |
| COMPARATIVE PRODUCT I | H/5 | 0.173 | 7 | BREAKAGE/UNSTABLE CUTTING CHIPS | ACCEPTABLE (WP 0.5 ROTATIONS) |

THREAD-CUTTING TAP

TECHNICAL FIELD

The present invention relates to a thread-cutting tap, and more particularly to restraint of chipping and stabilization of thread accuracy.

BACKGROUND ART

There is known a thread-cutting tap in which a thread is circumferentially divided by a spiral or straight flute into divided portions, and a cutting edge is defined by cooperation of ends of the respective divided portions, namely, defined by end faces of the respective divided portions and extends along the spiral or straight flute, wherein the thread has a thread profile that becomes from an incomplete profile with its crest portion being cut, to a complete profile, in a direction away from a distal end of a chamfered portion of the thread-cutting tap toward a complete thread portion of the thread-cutting tap. There are proposed a plurality of taps in which each of the cutting edges is chamfered to restrain chipping (small breakage caused on the cutting edge) which could be caused in the known thread-cutting tap during the cutting operation. For example, in Patent Document 1, there is disclosed a technique of chamfer a part of a rake face which is contiguous to the cutting edge, wherein the chamfered part extends circumferentially rearwardly as it extends toward a crest of the thread. Further, in Patent Document 2, there is disclosed a technique of chamfering a part of a rake face which is contagious to the cutting edge, such that the chamfered part provides a negative rake. Moreover, there is proposed a technique of rounding a part of a rake face which is contagious to the cutting edge.

PRIOR ART DOCUMENTS

Patent Documents

[Patent Document 1] JP-2008-272856A
[Patent Document 2] JP-H07-164247A

DISCLOSURE OF THE INVENTION

Object to be Achieved by the Invention

In the thread-cutting taps disclosed, for example, in Patent Document 1 and Patent Document 2, the tool life is improved by restraint of chipping owing to the arrangement in which a part of the rake face contiguous to the cutting edge is chamfered. However, there is a problem that accuracy of internal thread machined by the tap is not stabilized. The internal thread accuracy corresponds to a dimensional accuracy of the internal thread that has been machined by the tap. As a factor impeding the stabilization of the internal thread accuracy, it is considered that a thrust force, which is generated onto the thread-cutting tap upon start of the thread machining by the tap, acts in a negative direction and is increased due to the arrangement in which the cutting edge is chamfered, so that the thread-cutting tap advances too much in a cutting direction.

The present invention was made in view of the background discussed above. It is therefore an object of the present invention to provide a thread-cutting tap that makes it possible to restrain chipping that could be caused during thread machining performed by the tap and to stabilize accuracy of internal thread machined by the tap.

Measures for Achieving the Object and Effect

To achieve the object, the first aspect of the invention provides a thread-cutting tap in which (a) a thread is circumferentially divided by an axially extending flute into divided portions, and a cutting edge is defined by cooperation of ends of the respective divided portions and extends along the axially extending flute, each of the ends of the respective divided portions being one of circumferentially opposite ends of a corresponding one of the divided portions, the thread having a thread profile that becomes from an incomplete profile to a complete profile in a direction away from a distal end of a chamfered portion of the thread-cutting tap toward a complete thread portion of the thread-cutting tap, (b) wherein the cutting edge is provided with a protrusion portion at least in a radially outer end portion of the chamfered portion, such that the protrusion portion protrudes from a rake face of the cutting edge forwardly in a rotation direction of the thread-cutting tap, and extends along the cutting edge.

Effect of the Invention

According to the above-described first aspect of the invention, owing to the provision of the protrusion portion protruding from the rake face of the cutting edge forwardly in the rotation direction, the chipping is restrained. Further, owing to the provision of the protrusion portion, the thrust load acting in the negative direction upon biting of the spiral tap into the work material is reduced, whereby the excessive advance of the spiral tap is avoided and the internal thread accuracy is stabilized.

Preferably, the protrusion portion has a width that is within a range between $\frac{1}{80}$ of a standard height of the internal thread and $\frac{1}{20}$ of the standard height, wherein the width is defined as a dimension of the protrusion portion which is measured in a radial direction of the thread-cutting tap on a cross section of the protrusion portion that is perpendicular to an axis of the thread-cutting tap. Owing to the arrangement in which the width of the protrusion portion is within the above-described range, the chipping is restrained and the internal thread accuracy is stabilized.

Preferably, the protrusion portion is a portion that is formed by plastically deforming at least one burr in a blasting operation using glass beads, wherein the at least one burr is formed on the cutting edge upon formation of the thread in a grinding operation using a grinding wheel. Thus, the protrusion portion can be easily formed.

BRIEF DESCRIPTION OF DRAWINGS

FIG. 8 is a view showing results of a durability test that was conducted by using a plurality of types of spiral taps.

MODES FOR CARRYING OUT THE INVENTION

Preferably, the thread-cutting tap may be constituted by using various tool materials such as high speed tool steel and cemented carbide, and may be coated with hard coating made of, for example, Ti Al N, Ti N and Ti CN, as needed.

An embodiment of the present invention will now be described in detail with reference to the drawings. In the following description of the embodiment, the figures are simplified or deformed as needed and portions are not necessarily precisely depicted in terms of dimension ratio, shape, etc.

EMBODIMENT

Figure 1A:
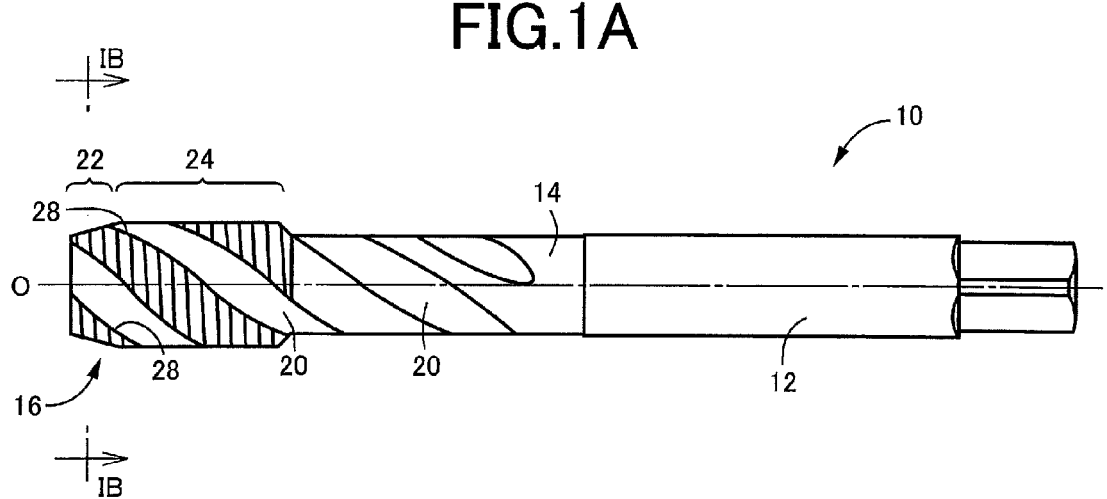
FIGS. 1A and 1B are a set of views showing a three-fluted spiral tap to which the present invention is advantageously applied.
Figure 1B:
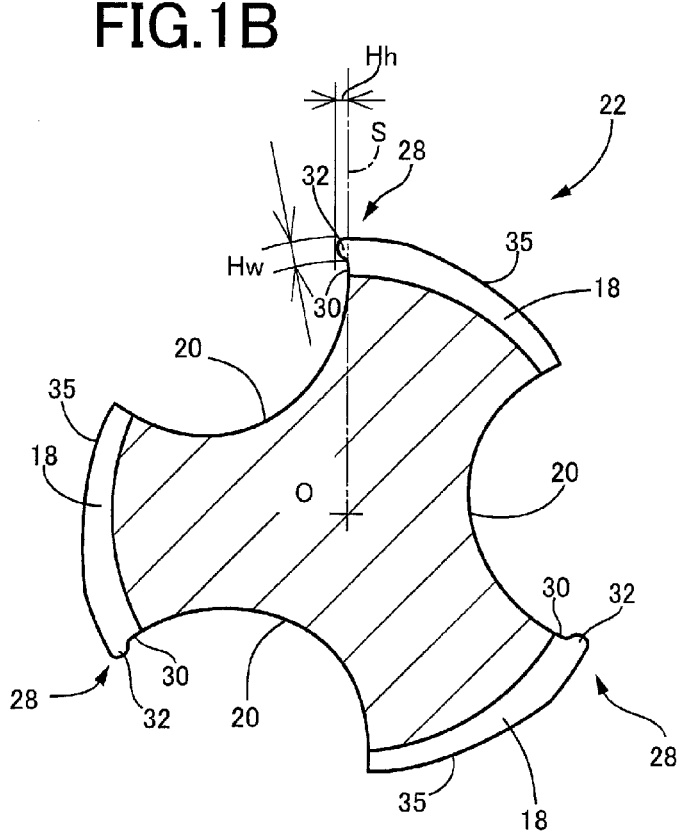

FIGS. 1A and 1B are a set of views showing a three-fluted spiral tap 10 (spiral tap having three cutting edges) to which the present invention is advantageously applied. FIG. 1A is a front view of the tap 10 as seen in a direction perpendicular to an axis O the tap 10. FIG. 1B is an enlarged view showing a cross section IB-IB indicated in FIG. 1A. This spiral tap 10 includes a shank portion 12, a neck portion 14 and a thread portion 16 which are arranged in this order of description and integral with one another. The shank portion 12, neck portion 14 and thread portion 16 are coaxial with one another, and have respective axes aligned with the same axis O. In the thread portion 16, there is provided an external thread that has a thread groove shape corresponding to an internal thread that is to be machined by the tap 10. Further, in the thread portion 16, there are provided three spiral flutes 20 that are located around the axis O and are equally spaced apart from one another, such that the external thread is divided by the spiral flutes 20 into divided portions. The thread portion 16 includes a chamfered portion 22 located in a distal end portion of the tap 10 and a complete thread portion 24 contiguous to the chamfered portion 22. In the chamfered portion 22, the thread 18 is partially removed such that the chamfered portion 22 is tapered in the axial direction. In the complete thread portion 24, the thread 18 has a complete thread profile. A cutting edge 28 is defined by one of widthwise opposite edges of each of the three spiral flutes 20, i.e., by intersections of each of the three spiral flutes 20 with the above-described divided portions into which the external thread is divided by the spiral flutes 20. Each of the spiral flutes 20, which is a right-hand helix flute, passes through the thread portion 16 and extends though almost full length of the neck portion 14.

In the chamfered portion 22, the cutting edge 28 is provided with a circle-shaped protrusion portion 32 which protrudes from a rake face 30 forwardly in a rotation direction of the tap 10 and which extends along the cutting edge 28. As shown in FIG. 1B, the circle-shaped protrusion portion 32 is formed to have a semi-circular shape in its cross section perpendicular to the axis O and to extend along the cutting edge 28. The circle-shaped protrusion portion 32 protrudes, in the rotation direction, from a reference line S that connects the axis O and a radially distal end of the cutting edge 28 (radially outer end of the rake face 30). The circle-shaped protrusion portion corresponds to a protrusion portion of the present invention.

Figure 2:
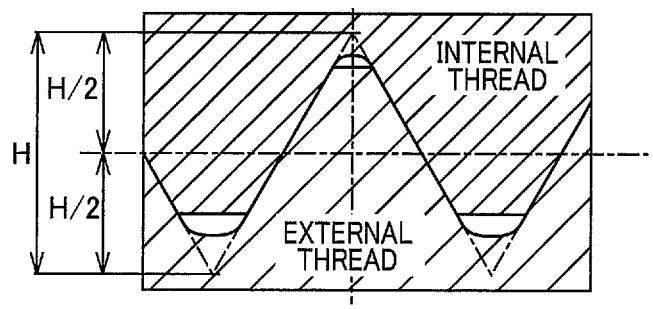
FIG. 2 is a view for explaining a basic thread height H.

In the cross section of the circle-shaped protrusion portion 32 which is perpendicular to the axis O, as shown in FIG. 1B, a width Hw of the circle-shaped protrusion portion 32, which corresponds to a radial dimension of the circle-shaped protrusion portion 32, is designed to be within a range between 1/80 of a basic thread height H (basic profile height H) that is determined in accordance with JIS thread standard and 1/20 of the basic thread height H. The basic thread height H corresponds to a height H of a basic profile defined by external and internal threads as shown in FIG. 2. A height Hh shown in FIG. 1B. i.e., a distance from the rake face 30 to a distal end of the circle-shaped protrusion portion 32 is within a range between 5-20 μm as its average value. The cutting edge 28 is provided with the circle-shaped protrusion portion 32 at least in a radially outer end portion of the chamfered portion 22. However, the cutting edge 28 is provided with the circle-shaped protrusion portion 32 also in other portion (e.g., a thread flank portion) of the chamfered portion 22 and/or in the complete thread portion 24.

Figure 3:
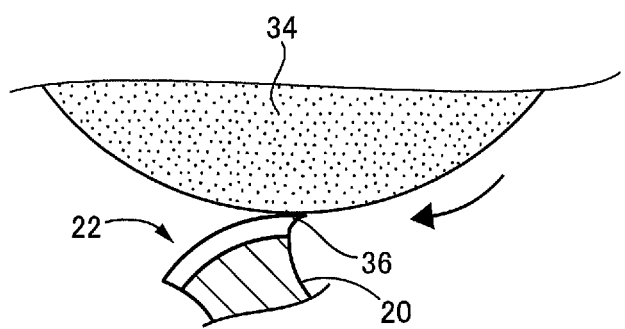
FIG. 3 is a view for explaining a step of producing a thread of the spiral tap of FIGS. 1A and 1B.
Figure 4:
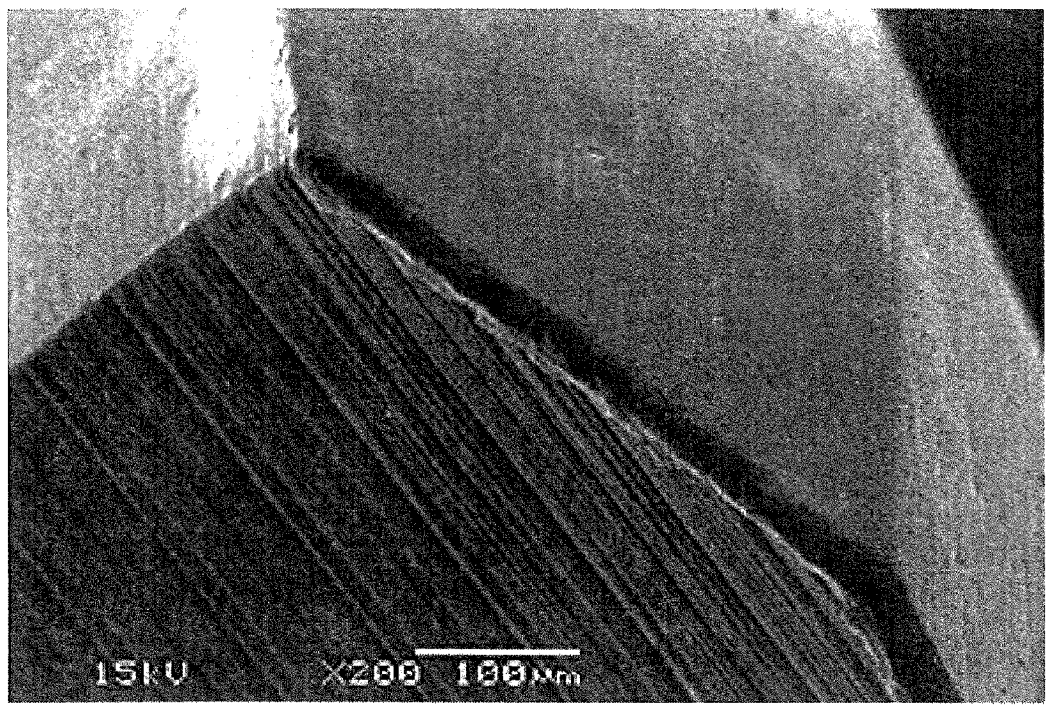
FIG. 4 is a photograph taken with magnification using an electron microscope and showing a circle-shaped protrusion portion, which is formed by carrying out a blasting operation.

There will be next described a method of producing the circle-shaped protrusion portion 32 that is shown in FIG. 1B. FIG. 3 shows a step of producing the chamfered portion 22 provided in the spiral tap 10. Prior to this step of producing the chamfered portion 22, the spiral flutes 20 and the thread 18 are formed in a known grinding step. Thus, this step of producing the chamfered portion 22 is implemented in a state in which the spiral flutes 20 and the thread 18 are already formed. The chamfered portion 22 is formed when the distal end portion of the tap 10 is ground at its outer circumferential surface by rotating a grinding wheel 34, as shown in FIG. 3, for removing a crest portion and relieving to form a flank face 35. In this instance, a burr or burrs 36 are formed in the radially outer end portion of the chamfered portion 22, i.e., a portion that constitutes the cutting edge 28. Conventionally, the burr 36 remaining after the production of the chamfered portion 22 had been removed by a grinding operation or the like. On the other hand, in the present embodiment, the burr 36 is subjected to a known blasting operation that is carried out by blasting glass beads onto the burr 36. With this blasting operation being carried out, the burr 36 is plastically deformed whereby the circle-shaped protrusion portion 32 is formed as shown in FIG. 1B. The width Hw and the height Hh of the circle-shaped protrusion portion 32 can be adjusted by suitably adjusting granularity of the glass beads, a time length of the blasting operation and a pressure at which the glass beads are blasted. FIG. 4 shows the circle-shaped protrusion portion 32, which is formed at the cutting edge 28 in the chamfered portion 22, by carrying out the above-described blasting operation. The photograph of FIG. 4 was taken with magnification using an electron microscope, and a portion, which is bulged to protrude so as to have a circular shape and which extends, corresponds to the circle-shaped protrusion portion 32.

FIGS. 5-7 show measurement results of an initial performance test that was conducted for measuring a torque T and a thrust force Fs in a thread machining using each of spiral taps described later and also an accuracy of internal thread machined by each of the spiral taps. The condition of the thread machining for the test is as follows:

[Test Condition]
Size: M6×1
Cutting speed: 15 m/min
Work material: S45C
Prepared hole: φ5 mm×15 mm
Machine: Vertical machining center with use of water-soluble cutting fluid (10-times dilution)
Depth of cut: 12 mm (blind hole)

In each of graphs of FIGS. 5-7, its abscissa axis represents the machining time, its left-side ordinate axis represents the rotational torque Tr, and its right-side ordinate axis represents the thrust force Fs. The torque is the rotational torque Tr of each spiral tap. The thrust force is a force which is generated during the thread machining and which acts on the spiral tap in a direction of advance of the spiral tap. This thrust force Fs is generated by a so-called "corkscrew effect" taking place by the spiral tap that is caused to bite into the work material while being rotated. The torque Tr and the thrust force Fs were measured by a well-known three-force-components meter. The accuracy of the machined internal thread was measured by a well-known thread gauge. For the internal thread accuracy indicated in FIGS. 5-7, it is judged to be acceptable (satisfactory accuracy of the internal thread) in a case where a no-go gauge (no-go end of a thread gauge) is screwed into the machined internal thread and stopped within a predetermined number of rotations (two rotations in the present embodiment).

Figure 5A:
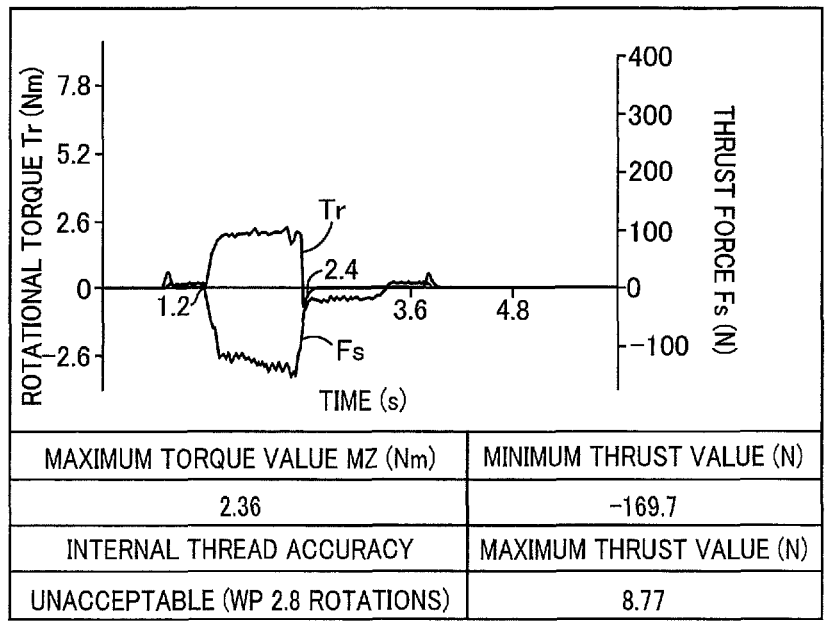
FIGS. 5A and 5B are a set of views showing test results of an initial performance test that was conducted for a spiral tap in which the circle-shaped protrusion portion is not provided.
Figure 5B:
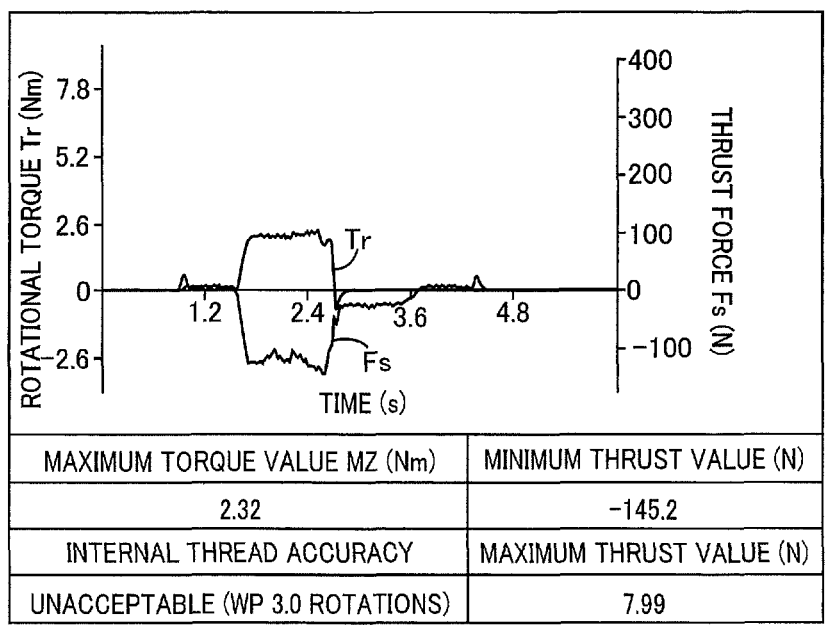

In FIGS. 5A and 5B, FIG. 5A shows results of measurements made for a conventional spiral tap in which burrs formed during production of the thread were removed, and FIG. 5B shows result of measurements made for a spiral tap in which the cutting edges are round-chamfered. The torque Tr is increased when the spiral tap is caused to bite into the work material, and the thrust force Fs, which acts in the axial direction of the spiral tap, is generated with the increase of the torque Tr. As shown in FIG. 5A, upon start of the test for the conventional spiral tap with the burr being removed, the thrust force Fs, which acts in a negative direction, i.e., in a cutting direction, is generated immediately after the tap is caused to bite into the work material. When the negative thrust force Fs becomes large, the spiral tap tends to advance excessively in the cutting direction. FIG. 5A shows the tendency that the spiral tap advances excessively due to the large generation of the negative thrust force, which starts immediately after the tap is caused to bite into the work material. As a result of the excessive advance, the no-go gauge was screwed into a first threaded hole by 2.8 rotations (WP2.8), so that the first threaded hole was judged to be unacceptable in terms of the internal thread accuracy since the no-go gauge was screwed into it by more than two rotations. The performance test was continued by using this spiral tap, and second and third threaded holes were also judged to be unacceptable in terms of the internal thread accuracy.

Also in the tap with the cutting edges being round-chamfered, the thrust force Fs acting in the negative direction becomes large immediately after the tap is caused to bite into the work material, as shown in FIG. 5B. Thus, also in the case where the cutting edges are round-chamfered, there was the tendency that the spiral tap advances excessively. As a result of the excessive advance, the no-go gauge (WP) was screwed into a first threaded hole by 3 rotations, so that the first threaded hole was judged to be unacceptable in terms of the internal thread accuracy. The performance test was continued by using this spiral tap, and second and third threaded holes were also judged to be unacceptable in terms of the internal thread accuracy.

Figure 6A:
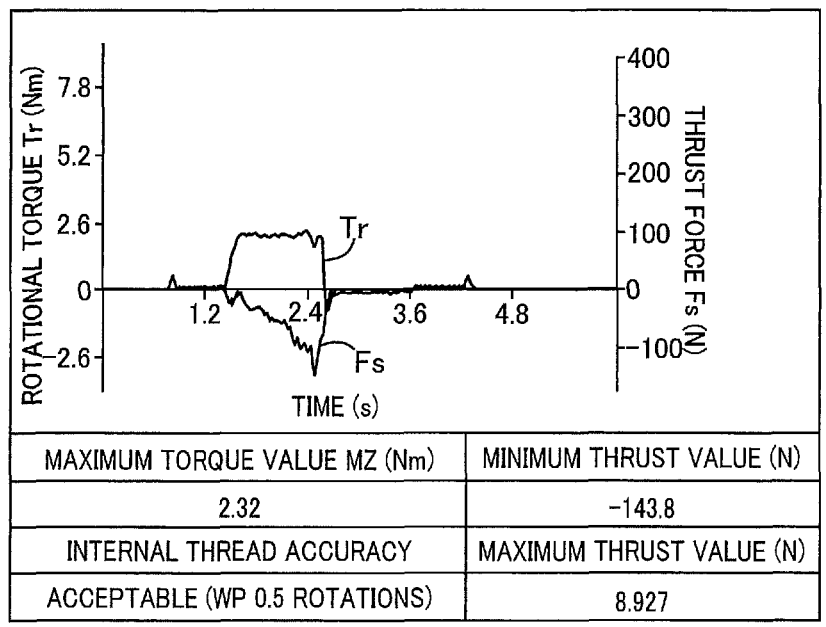
FIGS. 6A and 6B are a set of views showing test results of an initial performance test that was conducted for a spiral tap in which burrs formed during production of the thread remain without the removal of the burrs.
Figure 6B:
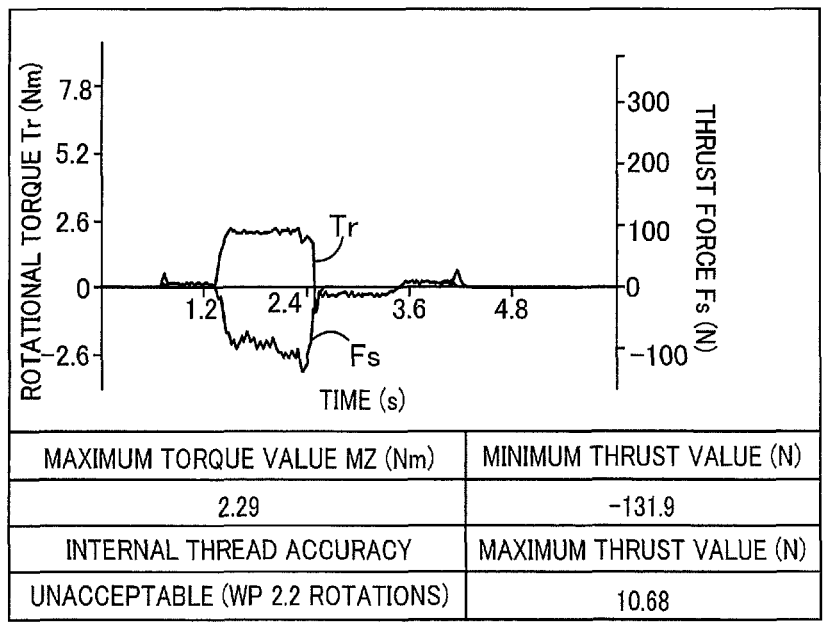

In FIGS. 6A and 6B, both of FIGS. 6A, B show results of measurements made for a spiral tap in which burrs formed during production of the thread remain without the removal, wherein FIG. 6A shows results of measurements of a first threaded hole and FIG. 6B shows those of a second threaded hole. In the tap with the remaining burrs, the thrust force Fs generated during machining of the first threaded hole is smaller than the thrust force Fs that is shown in FIGS. 5A and 5B, so that the tendency that the spiral tap advances excessively in the cutting direction is improved. Consequently, the no-go gauge (WP) stopped when having been screwed into the first threaded hole by 0.5 rotations so that it was judged to be unacceptable in terms of the internal thread accuracy. The second threaded hole machined by using this spiral tap provided the results shown in FIG. 6B. The thrust force Fs generated during machining of the second threaded hole was larger than that generated during machining of the first threaded hole. Thus, during machining of the second threaded hole, the spiral tap tended to advance excessively in the cutting direction. The no-go gauge was screwed into the second threaded hole by 2.2 rotations so that it was judged to be unacceptable in terms of the internal thread accuracy. It is considered because the burrs were broken during machining of the first threaded hole and then the second threaded hole was machined practically by a conventional spiral tap in which the burrs were removed.

Figure 7A:
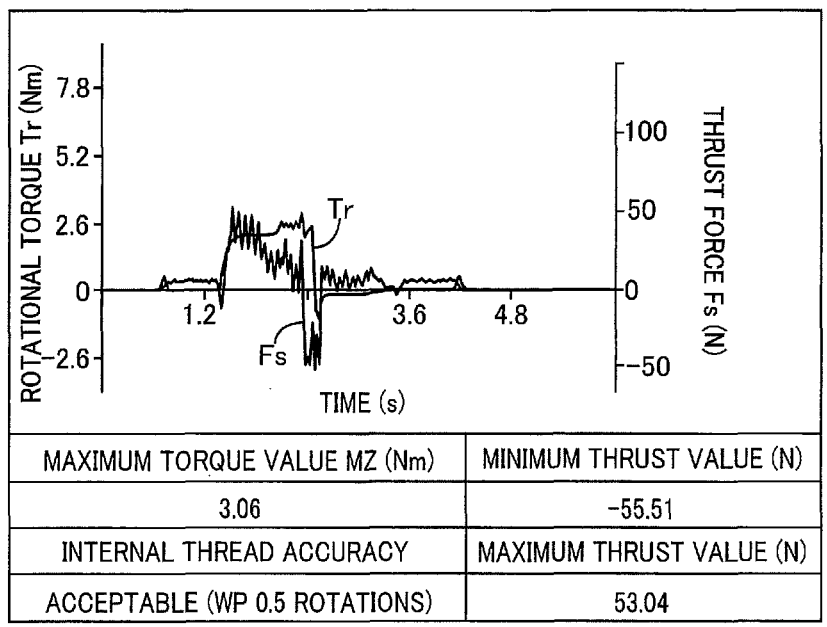
FIGS. 7A and 7B are a set of views showing test results of an initial performance test that was conducted for a spiral tap according to the present application in which the circle-shaped protrusion portion is provided.
Figure 7B:
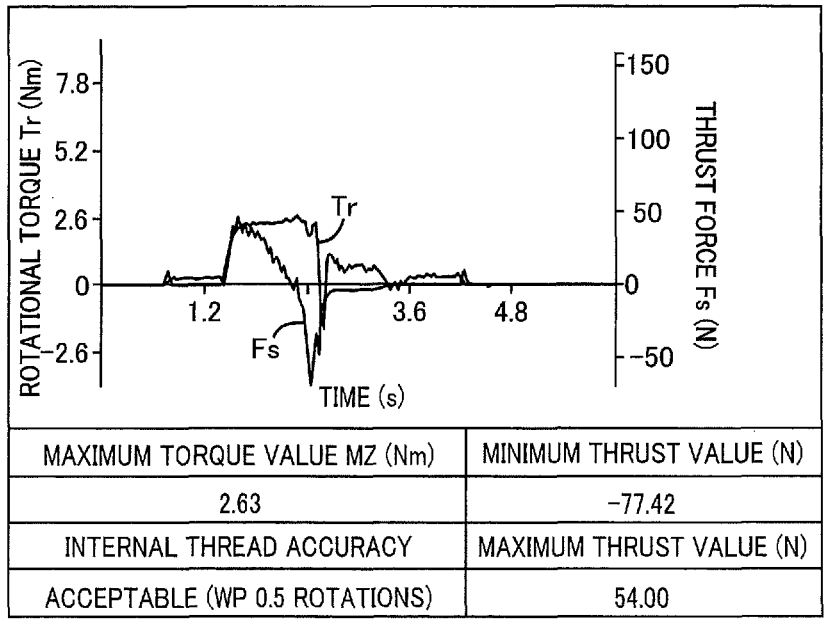

FIGS. 7A and 7B show results of measurements made for the spiral tap 10 having the circle-shaped protrusion portions 32 formed therein. This test was conducted by using, as the spiral tap 10, a spiral tap in which the width Hw of the circle-shaped protrusion portion 32 is H/50 as its average value. FIG. 7A shows results of measurements of a first threaded hole. As shown in FIG. 7A, the thrust force Fs is a positive value immediately after a portion of the thread 18 which is located in the chamfered portion 22 is caused to bite into the work material, and the thrust force Fs is changed to a negative value as the machining develops. The minimum value of the thrust force Fs during the machining is −55.51 (N), which is remarkably smaller than that during the machining performed by the other spiral taps. Thus, there is not substantially the tendency that the spiral tap advances excessively during the thread machining. Consequently, the no-go gauge stopped when it had been screwed by 0.5 rotations, so that the first threaded hole was judged to be acceptable in terms of the internal thread accuracy. The test was continued by using this spiral tap 10, and the thrust force Fs was not largely changed even in results of measurements of a 100th threaded hole, which are shown in FIG. 7B. Like in the first threaded hole, the no-go gauge stopped when it had been screwed by 0.5 rotations. Thus, the internal thread accuracy was maintained even after 100 holes had been machined.

FIG. 8 shows results of tests that were conducted by using a plurality of kinds of spiral taps to test a durability performance of each of the spiral taps. The durability performance was tested by performing a thread machining by using each spiral tap, and measuring a durability number (number of machined holes) until chipping or breakage of the spiral tap took place or until the internal thread accuracy became unacceptable based on a judgment made for the machined internal thread by using known go gauge and no-go gauge for measuring the internal thread accuracy. The larger the durability number is, the more excellent the spiral tap is in terms of durability performance. All of the used spiral taps are designed such that a length of the chamfered portion 22 corresponds to 2.5 pitches. The test condition is not described herein since it is the same as that in the tests shown in FIGS. 5-7. The width Hw indicated in FIG. 8 corresponds to the width Hw of the circle-shaped protrusion portion 32, and is represented by its conversion in the basic thread height H and also by its actual value. The width Hw (average value) of the circle-shaped protrusion portion 32 of each of the spiral taps actually used in the tests is not precisely equal to that indicated in FIG. 8, but is close to that indicated in FIG. 8.

The prior art A shown in FIG. 8 is a spiral tap (without the circle-shaped protrusion portion) in which the burrs were removed by a grinding or blasting operation or the like. The test for this spiral tap was suspended after a first threaded hole had been machined because the first threaded hole was not acceptable in terms of the internal thread accuracy. That is, the durability number (number of machined holes) was zero. The prior art B is a spiral tap (without the circle-shaped protrusion portion) in which the cutting edges were round-chamfered. The test for this spiral tap also was suspended after a first threaded hole had been machined because the first threaded hole was not acceptable in terms of the internal thread accuracy.

The comparative product C is a spiral tap provided with circle-shaped protrusion portions whose width Hw is adapted to be 1/10 of the basic thread height (basic profile height H) H. The test for this comparative product C was continued because the threaded hole machined by the comparative product C was acceptable in terms of the internal thread accuracy at an initial stage, with the no-go gauge being screwed by 1.5 rotations (WP 1.5 rotations). Then, the test was suspended when the durability number (number of machined holes) reached 1300, because the cutting edge breakage (chipping) of the spiral tap became large at the time. This reveals that, where the width Hw of the circle-shaped protrusion portion 32 is too small, the internal thread accuracy is likely to become unstable and the effect of restraining the chipping is lowered.

The invention product D corresponding to the spiral tap constructed according to the present embodiment is provided with the circle-shaped protrusion portions 32 whose width Hw is adapted to be 1/80 of the basic thread height H (H/80). In this spiral tap, a satisfactory result was obtained in terms of the internal thread accuracy at an initial stage, with the no-go gauge being screwed by 0.5 rotations (WP 0.5 rotations). In the subsequent durability test, a satisfactory result was obtained also in terms of the durability, with the durability number (number of machined holes) having reached 2487 until the spiral tap was broken. Moreover, the satisfactory internal thread accuracy was maintained.

The spiral tap of the invention product E is provided with the circle-shaped protrusion portions 32 whose width Hw is adapted to be H/50. In this spiral tap, too, a satisfactory result was obtained in terms of the internal thread accuracy at an initial stage, with the no-go gauge being screwed by 0.5 rotations. In the subsequent durability test, the test was terminated when the durability number reached 2830 because the wear of the tap became large at the time. It was judged that the wear was large when the go gauge no longer passed. The internal thread accuracy became unacceptable when the durability number reached 2830. It is noted that the go gauge does not pass when the wear becomes large, because an amount of cut by the tap is reduced with increase of the wear of the tap. Thus, the spiral tap of the invention product E was excellent also in durability (durability number 2830), and chipping was not hardly seen.

The spiral tap of the invention product F is provided with the circle-shaped protrusion portions 32 whose width Hw is adapted to be H/30. In this spiral tap, too, a satisfactory result was obtained in terms of the internal thread accuracy at an initial stage, with the no-go gauge being screwed by 0.5 rotations. In the subsequent durability test, the test was terminated when the durability number reached 2854 because the wear of the tap became large (the internal thread accuracy became unacceptable) at the time. This invention product F also was excellent in durability (durability number 2854), and chipping was not hardly seen. The spiral tap of the invention product G is provided with the circle-shaped protrusion portions 32 whose width Hw is adapted to be H/20. In this spiral tap, too, a satisfactory result was obtained in the internal thread accuracy at an initial stage, with the no-go gauge being screwed by 0.5 rotations. In the subsequent durability test, the test was terminated when the durability number reached 2349 because unusual noises were generated at the time. However, it was excellent also in durability with the durability number of 2349.

The spiral tap of the comparative product H is provided with the circle-shaped protrusion portions 32 whose width Hw is adapted to be H/10. In this spiral tap, too, a satisfactory result was obtained in terms of the internal thread accuracy at an initial stage, with the no-go gauge being screwed by 0.5 rotations. In the subsequent durability test, when the durability number reached 560, the shape of cutting chips was changed and became unstable and the spiral tap was broken. The spiral tap of the comparative product I is provided with the circle-shaped protrusion portions 32 whose width Hw is adapted to be H/5. In this spiral tap, too, a satisfactory result was obtained in terms of the internal thread accuracy at an initial stage, with the no-go gauge being screwed by 0.5 rotations. In the subsequent durability test, when the durability number reached 7, the shape of cutting chips was changed and became unstable and the tap was broken. Thus, where the width Hw of the circle-shaped protrusion portion 32 exceeds H/10, the tap can be easily broken, and the shape of the cutting chips is changed and becomes unstable.

As described above, it was confirmed that, where the width Hw of the circle-shaped protrusion portion 32 is within the range between H/80 and H/20, the internal thread accuracy was stabilized and the chipping was restrained. Particularly, where the width Hw of the circle-shaped protrusion portion 32 is within a range between H/50 and H/30, the durability was remarkably improved.

As described above, in the present embodiment, owing to the circle-shaped protrusion portion 32 provided in the rake face 30 of the cutting edge 28, the chipping is restrained. Further, the thrust load Fs acting in the negative direction upon biting of the spiral tap 10 into the work material is reduced, whereby the excessive advance of the spiral tap 10 is avoided and the internal thread accuracy is stabilized.

Further, in the present embodiment, owing to the arrangement in which the width Hw of the circle-shaped protrusion portion 32 is within the range between 1/80 and 1/20 of the basic thread height H of the internal thread, the chipping is restrained and the internal thread accuracy is stabilized.

Further, in the present embodiment, the circle-shaped protrusion portion 32 can be easily formed in the blasting operation using glass beads, which is performed on the burrs 36 that are formed on the cutting edge 28 upon formation of the thread 18 in the grinding operation.

While the embodiment of the present invention has been described in detail by reference to the accompanying drawings, it is to be understood that the present invention may be otherwise embodied.

For example, while the spiral tap 10 is provided with the spiral flutes 20 in the above-described embodiment, each of the flutes may be a straight flute or a spiral point flute.

While the spiral tap 10 is constructed with the three cutting edges in the above-described embodiment, the number of the cutting edges is not particularly limited.

Further, in the above-described embodiment, the burrs 36 are subjected to the blasting operating that is carried out by using the glass beads whereby the circle-shaped protrusion portion 32 is formed. However, the blasting operating does not have be carried out by using necessarily the glass beads but may be carried out by using other materials such as steel balls.

Further, in the above-described embodiment, the circle-shaped protrusion portion 32 is formed to extend continuously along the cutting edge 28. However, the protrusion portion 32 may be provided only in the radially outer end portion of the thread. Further, the protrusion portion 32 may be provided not only in the chamfered portion 22 but also in the complete thread portion 24.

Further, in the above-described embodiment, the circle-shaped protrusion portion 32 is formed to have the semi-circular shape in its cross section. However, the protrusion portion 32 does not have to be necessarily the semi-circular shape in its cross section, but may be other shape such as an ellipse shape as long as it is a protruding shape.

The above description is merely an embodiment and the present invention may be implemented in variously modified and improved forms based on the knowledge of those skilled in the art.

DESCRIPTION OF REFERENCE SIGNS

10: spiral tap (thread-cutting tap)
18: thread
20: spiral flute (flute)
22: chamfered portion
24: complete thread portion
28: cutting edge
32: circle-shaped protrusion portion (protrusion portion)
36: burr
H: basic thread height
Hw: width of circle-shaped protrusion portion

The invention claimed is:

1. A thread-cutting tap that is to be rotated in a rotation direction for cutting an internal thread in a work material, the thread cutting tap comprising:

a thread portion having an external thread provided therein, and including a chamfered portion and a complete thread portion that is axially contiguous to the chamfered portion;

a flute extending from an axially distal end of the tap toward an axially proximal end of the tap, the external thread having an end face defined by one of widthwise opposite end portions of the flute;

a rake face defined by a radially inner portion of the end face of the external thread at the one of the widthwise opposite end portions of the flute, so as to extend along the flute;

a cutting edge defined by a radially outer portion of the end face of the external thread at the one of the widthwise opposite edges of the flute, so as to be adjacent to the rake face and extend along the flute; and the cutting edge being provided with a protrusion portion at least in a radially outer end portion of the chamfered portion, such that the protrusion portion protrudes from the rake face forwardly in the rotation direction and extends along the cutting edge.

2. The thread-cutting tap according to claim 1, wherein when the thread-cutting tap cuts an internal thread having a predetermined standard height, the protrusion portion has a width that is within a range between $1/80$ of the standard height of the internal thread and $1/20$ of the standard height, the width being defined as a dimension of the protrusion portion which is measured in a radial direction of the thread-cutting tap on a cross section of the protrusion portion that is perpendicular to an axis of the thread-cutting tap.

3. The thread-cutting tap according to claim 1, wherein the protrusion portion is a portion that is formed by plastically deforming at least one burr in a blasting operation using glass beads, the at least one burr being formed on the cutting edge upon formation of the external thread in a grinding operation using a grinding wheel.

4. The thread-cutting tap according to claim 1, wherein the protrusion portion protrudes forwardly in the rotation direction, from a reference line that connects an axis of the thread-cutting tap and a radially outer end of the rake face.

5. The thread-cutting tap according to claim 1, wherein the protrusion portion has a semi-circular shape or an ellipse shape in a cross section thereof perpendicular to an axis of the thread-cutting tap.

6. The thread-cutting tap according to claim 1, wherein the protrusion portion is provided in a thread flank portion of the chamfered portion as well as the radially outer end portion of the chamfered portion.

* * * * *